United States Patent
Rampton et al.

(10) Patent No.: US 7,270,305 B2
(45) Date of Patent: Sep. 18, 2007

(54) AIRCRAFT LEADING EDGE APPARATUSES AND CORRESPONDING METHODS

(75) Inventors: Scott N. Rampton, Seattle, WA (US); Stephen R. Amorosi, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/868,234

(22) Filed: Jun. 15, 2004

(65) Prior Publication Data

US 2006/0000952 A1    Jan. 5, 2006

(51) Int. Cl.
*B64C 3/50*    (2006.01)

(52) U.S. Cl. ..................................... 244/214; 244/213

(58) Field of Classification Search ................ 244/198, 244/201, 203, 204, 213, 217, 214, 215, 34 R, 244/49
See application file for complete search history.

(56) References Cited

U.S. PATENT DOCUMENTS

| | | | |
|---|---|---|---|
| 1,724,456 A | 8/1929 | Crook |
| 1,770,575 A | 7/1930 | Ksoll |
| 2,086,085 A | 7/1937 | Lachmann et al. |
| 2,169,416 A | 8/1939 | Griswold |
| 2,282,516 A | 5/1942 | Hans et al. |
| 2,289,704 A | 7/1942 | Grant |
| 2,319,383 A | 5/1943 | Zap |
| 2,347,230 A | 4/1944 | Zuck |
| 2,358,985 A | 9/1944 | McAndrew |
| 2,378,528 A | 6/1945 | Arsandaux |
| 2,383,102 A | 8/1945 | Zap |
| 2,385,351 A | 9/1945 | Davidsen |
| 2,387,492 A | 10/1945 | Blaylock et al. |
| 2,389,274 A | 11/1945 | Pearsall et al. |
| 2,406,475 A | 8/1946 | Rogers |
| 2,422,296 A | 6/1947 | Flader et al. |
| 2,444,293 A | 6/1948 | Holt |
| 2,458,900 A | 1/1949 | Erny |
| 2,504,684 A | 4/1950 | Harper |

(Continued)

FOREIGN PATENT DOCUMENTS

DE    387 833    1/1924

(Continued)

OTHER PUBLICATIONS

"Flap (aircraft)", Wikipedia, The Free Encylopedia, Aug. 3, 2006, 10:18 UTC. Wikimedia Foundation, Inc. Aug. 5, 2006; http://wn.wikipedia.org/index.pho?title=Flap_%28aircraft%29&oldid=67413665>.

(Continued)

*Primary Examiner*—Timothy D. Collins
*Assistant Examiner*—Benjamin P. Lee
(74) *Attorney, Agent, or Firm*—Perkins Coie LLP

(57) ABSTRACT

Aircraft and leading edge apparatuses and corresponding methods are disclosed. In one embodiment, an aircraft system includes an airfoil with a leading edge device that is movable among a retracted position, at least one first extended position, and a second extended position. A first actuator can be operatively coupled to the leading edge device to move the flow surface between the retracted and the at least one first extended position. A second actuator can be operatively coupled to the leading edge device to move the flow surface between the at least one first extended position and the second extended position.

48 Claims, 5 Drawing Sheets

U.S. PATENT DOCUMENTS

| | | |
|---|---|---|
| 2,518,854 A | 8/1950 | Badenoch |
| 2,563,453 A | 8/1951 | Briend |
| 2,652,812 A | 9/1953 | Fenzl |
| 2,665,084 A | 1/1954 | Feeney et al. |
| 2,851,229 A | 9/1958 | Clark |
| 2,864,239 A | 12/1958 | Taylor |
| 2,877,968 A | 3/1959 | Granan et al. |
| 2,886,008 A | 5/1959 | Geyer et al. |
| 2,891,740 A | 6/1959 | Campbell |
| 2,892,312 A | 6/1959 | James et al. |
| 2,899,152 A | 8/1959 | Weiland |
| 2,912,190 A | 11/1959 | MacDonough |
| 2,920,844 A | 1/1960 | Marshall et al. |
| 2,938,680 A | 5/1960 | Lawrence et al. |
| 2,990,144 A | 6/1961 | Hougland |
| 2,990,145 A | 6/1961 | Hougland |
| 3,013,748 A | 12/1961 | Westburg |
| 3,089,666 A | 5/1963 | Quenzler |
| 3,102,607 A | 9/1963 | Roberts |
| 3,112,089 A | 11/1963 | Dornier |
| 3,136,504 A | 6/1964 | Carr |
| 3,166,271 A | 1/1965 | Zuck |
| 3,191,147 A | 6/1965 | Majendie |
| 3,203,275 A | 8/1965 | Hoover |
| 3,203,647 A | 8/1965 | Alvarez-Calderon |
| 3,282,535 A | 11/1966 | Steiner |
| 3,375,998 A | 4/1968 | Alvarez-Calderon |
| 3,447,763 A | 6/1969 | Allcock |
| 3,463,418 A | 8/1969 | Miksch |
| 3,504,870 A | 4/1970 | Cole et al. |
| 3,528,632 A | 9/1970 | Miles et al. |
| 3,539,133 A | 11/1970 | Robertson |
| 3,556,439 A | 1/1971 | Autry et al. |
| 3,587,311 A | 6/1971 | Hays, Jr. |
| 3,589,648 A | 6/1971 | Gorham et al. |
| 3,642,234 A | 2/1972 | Kamber et al. |
| 3,653,611 A | 4/1972 | Trupp et al. |
| 3,659,810 A | 5/1972 | Robertson |
| 3,677,504 A | 7/1972 | Schwarzler |
| 3,704,828 A | 12/1972 | Studer et al. |
| 3,704,843 A | 12/1972 | Jenny |
| 3,711,039 A | 1/1973 | James |
| 3,730,459 A | 5/1973 | Zuck |
| 3,743,219 A | 7/1973 | Gorges |
| 3,767,140 A | 10/1973 | Johnson |
| 3,794,276 A | 2/1974 | Maltby et al. |
| 3,813,062 A | 5/1974 | Prather |
| 3,827,658 A | 8/1974 | Hallworth |
| 3,831,886 A | 8/1974 | Burdges et al. |
| 3,836,099 A | 9/1974 | O'Neill et al. |
| 3,837,601 A | 9/1974 | Cole |
| 3,862,730 A | 1/1975 | Heiney |
| 3,874,617 A | 4/1975 | Johnson |
| 3,897,029 A | 7/1975 | Calderon |
| 3,904,152 A | 9/1975 | Hill |
| 3,910,530 A | 10/1975 | James |
| 3,917,192 A | 11/1975 | Alvarez-Calderon |
| 3,931,374 A | 1/1976 | Moutet nee Layrisse et al. |
| 3,941,334 A | 3/1976 | Cole |
| 3,941,341 A | 3/1976 | Brogdon, Jr. |
| 3,949,957 A | 4/1976 | Portier et al. |
| 3,968,946 A | 7/1976 | Cole |
| 3,985,319 A | 10/1976 | Dean et al. |
| 3,987,983 A | 10/1976 | Cole |
| 3,992,979 A | 11/1976 | Smith |
| 3,993,584 A | 11/1976 | Owen et al. |
| 3,994,451 A | 11/1976 | Cole |
| 4,015,787 A | 4/1977 | Maieli et al. |
| 4,106,730 A | 8/1978 | Spitzer et al. |
| 4,117,996 A | 10/1978 | Sherman |
| 4,120,470 A | 10/1978 | Whitener |
| 4,131,253 A | 12/1978 | Zapel |
| 4,146,200 A | 3/1979 | Borzachillo |
| 4,171,787 A | 10/1979 | Zapel |
| 4,180,222 A | 12/1979 | Thornburg |
| 4,181,275 A | 1/1980 | Moelter et al. |
| 4,189,120 A | 2/1980 | Wang |
| 4,189,121 A | 2/1980 | Harper et al. |
| 4,189,122 A | 2/1980 | Miller |
| 4,200,253 A | 4/1980 | Rowarth |
| 4,202,519 A | 5/1980 | Fletcher |
| 4,247,843 A | 1/1981 | Miller |
| 4,262,868 A | 4/1981 | Dean |
| 4,267,990 A | 5/1981 | Staudacher et al. |
| 4,275,942 A | 6/1981 | Steidl |
| 4,283,029 A | 8/1981 | Rudolph |
| 4,285,482 A | 8/1981 | Lewis |
| 4,293,110 A | 10/1981 | Middleton |
| 4,312,486 A | 1/1982 | McKinney |
| 4,325,123 A | 4/1982 | Graham |
| 4,351,502 A | 9/1982 | Statkus |
| 4,353,517 A | 10/1982 | Rudolph |
| 4,358,077 A | 11/1982 | Coronel |
| 4,360,176 A | 11/1982 | Brown |
| 4,363,098 A | 12/1982 | Buus et al. |
| 4,365,774 A | 12/1982 | Coronel |
| 4,368,937 A | 1/1983 | Palombo |
| 4,384,693 A | 5/1983 | Pauly |
| 4,427,168 A | 1/1984 | McKinney |
| 4,441,675 A | 4/1984 | Boehringer |
| 4,444,368 A | 4/1984 | Andrews |
| 4,461,449 A | 7/1984 | Turner |
| 4,471,925 A | 9/1984 | Kunz et al. |
| 4,471,927 A | 9/1984 | Rudolph |
| 4,472,780 A | 9/1984 | Chenoweth et al. |
| 4,475,702 A | 10/1984 | Cole |
| 4,479,620 A | 10/1984 | Rogers et al. |
| 4,485,992 A | 12/1984 | Rao |
| 4,496,121 A | 1/1985 | Berlin |
| 4,498,646 A | 2/1985 | Proksch |
| 4,528,775 A | 7/1985 | Einarsson |
| 4,533,096 A | 8/1985 | Baker |
| 4,542,869 A | 9/1985 | Brine |
| 4,544,117 A | 10/1985 | Schuster |
| 4,553,722 A | 11/1985 | Cole |
| 4,575,030 A | 3/1986 | Gratzer |
| 4,575,099 A | 3/1986 | Nash |
| 4,576,347 A | 3/1986 | Opsahl |
| 4,637,573 A | 1/1987 | Perin |
| 4,650,140 A | 3/1987 | Cole |
| 4,691,879 A | 9/1987 | Greene |
| 4,700,911 A | 10/1987 | Zimmer |
| 4,702,441 A | 10/1987 | Wang |
| 4,706,913 A | 11/1987 | Cole |
| 4,712,752 A | 12/1987 | Victor |
| 4,717,097 A | 1/1988 | Sepstrup |
| 4,720,066 A | 1/1988 | Renken et al. |
| 4,729,528 A | 3/1988 | Borzachillo |
| 4,747,375 A | 5/1988 | Williams |
| 4,784,355 A | 11/1988 | Brine |
| 4,786,013 A | 11/1988 | Pohl |
| 4,789,119 A | 12/1988 | Bellego et al. |
| 4,796,192 A | 1/1989 | Lewis |
| 4,823,836 A | 4/1989 | Bachmann et al. |
| 4,838,503 A | 6/1989 | Williams et al. |
| 4,854,528 A | 8/1989 | Hofrichter et al. |
| 4,856,735 A | 8/1989 | Lotz |
| 4,860,007 A | 8/1989 | Konicke |
| 4,867,394 A | 9/1989 | Patterson, Jr. et al. |
| 4,892,274 A | 1/1990 | Pohl et al. |
| 4,899,284 A | 2/1990 | Lewis |
| 4,962,902 A | 10/1990 | Fortes |
| 5,039,032 A | 8/1991 | Rudolph |
| 5,046,688 A | 9/1991 | Woods |

| Patent Number | Date | Name |
|---|---|---|
| 5,050,081 A | 9/1991 | Abbott et al. |
| 5,056,741 A | 10/1991 | Bliesner et al. |
| 5,074,495 A | 12/1991 | Raymond |
| 5,082,207 A | 1/1992 | Tulinius |
| 5,082,208 A | 1/1992 | Matich |
| 5,088,665 A | 2/1992 | Vijgen |
| 5,094,411 A | 3/1992 | Rao |
| 5,094,412 A | 3/1992 | Narramore |
| 5,100,082 A | 3/1992 | Archung |
| 5,114,100 A | 5/1992 | Rudolph |
| 5,129,597 A | 7/1992 | Manthey |
| 5,158,252 A | 10/1992 | Sakurai |
| 5,167,383 A | 12/1992 | Nozaki |
| 5,203,619 A | 4/1993 | Welsch |
| 5,207,400 A | 5/1993 | Jennings |
| 5,244,269 A | 9/1993 | Harriehausen |
| 5,259,293 A | 11/1993 | Brunner |
| 5,280,863 A | 1/1994 | Schmittle |
| 5,282,591 A | 2/1994 | Walters et al. |
| 5,351,914 A | 10/1994 | Nagao |
| 5,388,788 A | 2/1995 | Rudolph |
| 5,420,582 A | 5/1995 | Kubbat |
| 5,441,218 A | 8/1995 | Mueller |
| 5,474,265 A | 12/1995 | Capbern |
| 5,493,497 A | 2/1996 | Buus |
| 5,535,852 A | 7/1996 | Bishop |
| 5,542,684 A | 8/1996 | Squirrell |
| 5,544,847 A | 8/1996 | Bliesner |
| 5,600,220 A | 2/1997 | Thoraval |
| 5,609,020 A | 3/1997 | Jackson |
| 5,680,124 A | 10/1997 | Bedell |
| 5,681,014 A | 10/1997 | Palmer |
| 5,686,907 A | 11/1997 | Bedell |
| 5,715,163 A | 2/1998 | Bang |
| 5,735,485 A | 4/1998 | Ciprian et al. |
| 5,740,991 A | 4/1998 | Gleine et al. |
| 5,743,490 A | 4/1998 | Gillingham |
| 5,746,490 A | 5/1998 | Domenig |
| 5,788,190 A | 8/1998 | Siers |
| 5,839,698 A | 11/1998 | Moppert |
| 5,875,998 A | 3/1999 | Gleine et al. |
| 5,921,506 A | 7/1999 | Appa |
| 5,927,656 A | 7/1999 | Hinkleman |
| 5,934,615 A | 8/1999 | Treichler |
| 5,978,715 A | 11/1999 | Briffe |
| 5,984,230 A | 11/1999 | Drazi |
| 6,015,117 A | 1/2000 | Broadbent |
| 6,033,180 A | 3/2000 | Machida et al. |
| 6,045,204 A | 4/2000 | Frazier |
| 6,057,786 A | 5/2000 | Briffe |
| 6,073,624 A | 6/2000 | Laurent |
| 6,076,767 A | 6/2000 | Farley et al. |
| 6,076,776 A | 6/2000 | Breitbach |
| 6,079,672 A | 6/2000 | Lam et al. |
| 6,082,679 A | 7/2000 | Crouch et al. |
| 6,085,129 A | 7/2000 | Schardt |
| 6,109,567 A | 8/2000 | Munoz |
| 6,112,141 A | 8/2000 | Briffe |
| 6,145,791 A | 11/2000 | Diller et al. |
| 6,152,405 A | 11/2000 | Muller et al. |
| 6,161,801 A | 12/2000 | Kelm |
| 6,164,598 A | 12/2000 | Young et al. |
| 6,173,924 B1 | 1/2001 | Young et al. |
| 6,188,937 B1 | 2/2001 | Sherry |
| 6,189,837 B1 | 2/2001 | Matthews |
| 6,213,433 B1 | 4/2001 | Gruensfelder |
| 6,227,498 B1 | 5/2001 | Arata |
| 6,244,542 B1 | 6/2001 | Young et al. |
| 6,293,497 B1 | 9/2001 | Kelley-Wickemeyer |
| 6,328,265 B1 | 12/2001 | Dizdarevic |
| 6,349,798 B1 | 2/2002 | McKay |
| 6,349,903 B2 | 2/2002 | Caton et al. |
| 6,364,254 B1 | 4/2002 | May |
| 6,375,126 B1 | 4/2002 | Sakurai |
| 6,382,566 B1 | 5/2002 | Ferrel et al. |
| 6,389,333 B1 | 5/2002 | Hansman |
| 6,431,498 B1 | 8/2002 | Watts et al. |
| 6,439,512 B1 | 8/2002 | Hart |
| 6,443,394 B1 | 9/2002 | Weisend |
| 6,450,457 B1 | 9/2002 | Sharp |
| 6,464,175 B2 | 10/2002 | Yada et al. |
| 6,466,141 B1 | 10/2002 | McKay et al. |
| 6,478,541 B1 | 11/2002 | Charles et al. |
| 6,481,667 B1 | 11/2002 | Ho |
| 6,484,969 B2 | 11/2002 | Sprenger |
| 6,499,577 B2 | 12/2002 | Kitamoto et al. |
| 6,536,714 B2 | 3/2003 | Gleine |
| 6,547,183 B2 | 4/2003 | Farnsworth |
| 6,554,229 B1 | 4/2003 | Lam |
| 6,561,463 B1 | 5/2003 | Yount et al. |
| 6,591,169 B2 | 7/2003 | Jones . |
| 6,598,829 B2 | 7/2003 | Kamstra |
| 6,598,834 B2 | 7/2003 | Nettle |
| 6,601,801 B1 | 8/2003 | Prow |
| 6,622,972 B2 | 9/2003 | Urnes |
| 6,622,974 B1 | 9/2003 | Dockter et al. |
| 6,625,982 B2 | 9/2003 | Van Den Bossche |
| 6,644,599 B2 | 11/2003 | Perez |
| 6,651,930 B1 | 11/2003 | Gautier et al. |
| 6,729,583 B2 | 5/2004 | Milliere et al. |
| 6,745,113 B2 | 6/2004 | Griffin, III et al. |
| 6,755,375 B2 | 6/2004 | Trikha |
| 6,796,526 B2 | 9/2004 | Boehringer |
| 6,796,534 B2 | 9/2004 | Beyer |
| 6,799,739 B1 | 10/2004 | Jones |
| 6,802,475 B2 | 10/2004 | Davies et al. |
| 6,824,099 B1 | 11/2004 | Jones |
| 6,843,452 B1 | 1/2005 | Vassberg et al. |
| 6,860,452 B2 | 3/2005 | Bacon et al. |
| 6,870,490 B2 | 3/2005 | Sherry et al. |
| 6,978,971 B1 | 12/2005 | Dun |
| 6,981,676 B2 | 1/2006 | Millere |
| 7,028,948 B2 | 4/2006 | Pitt |
| 7,048,228 B2 | 5/2006 | Vassberg et al. |
| 7,048,234 B2 | 5/2006 | Reeksiek et al. |
| 7,048,235 B2 | 5/2006 | McLean et al. |
| 7,051,982 B1 | 5/2006 | Johnson |
| 7,059,563 B2 | 6/2006 | Huynh |
| 2002/0046087 A1 | 4/2002 | Hey |
| 2002/0074459 A1 | 6/2002 | Gleine et al. |
| 2002/0100842 A1 | 8/2002 | Perez |
| 2003/0058134 A1 | 3/2003 | Sherry |
| 2003/0127569 A1 | 7/2003 | Bacon et al. |
| 2003/0132860 A1 | 7/2003 | Feyereisen |
| 2003/0197097 A1 | 10/2003 | Wakayama |
| 2004/0004162 A1 | 1/2004 | Beyer |
| 2004/0046087 A1 | 3/2004 | Beyer et al. |
| 2004/0059474 A1 | 3/2004 | Boorman |
| 2004/0195464 A1 | 10/2004 | Vassberg et al. |
| 2004/0245386 A1 | 12/2004 | Huynh |
| 2005/0011994 A1 | 1/2005 | Sakurai et al. |
| 2005/0017126 A1 | 1/2005 | McLean et al. |
| 2005/0061922 A1 | 3/2005 | Milliere |
| 2005/0242234 A1 | 11/2005 | Mahmulyin |
| 2005/0274847 A1 | 12/2005 | Charron |
| 2006/0038086 A1 | 2/2006 | Reckzeh |

FOREIGN PATENT DOCUMENTS

| | | |
|---|---|---|
| DE | 11 29 379 | 5/1962 |
| EP | 0100775 A1 | 2/1984 |
| EP | 0 103 038 | 3/1984 |
| EP | 0 370 640 | 5/1990 |
| EP | 0 483 504 A1 | 5/1992 |
| EP | 0 489 521 | 6/1992 |
| EP | 0 781 704 | 7/1997 |

| | | |
|---|---|---|
| EP | 0 947 421 | 10/1999 |
| EP | 1010616 | 6/2000 |
| EP | 1 547 917 A1 | 6/2005 |
| FR | 705155 | 6/1931 |
| FR | 984 443 | 7/1951 |
| FR | 56 121 | 9/1952 |
| FR | 57 988 | 9/1953 |
| FR | 58 273 | 11/1953 |
| GB | 886136 | 1/1962 |
| GB | 1 181 991 | 2/1970 |
| GB | 2 144 688 A | 3/1985 |
| WO | WO-02/24530 | 3/2002 |

OTHER PUBLICATIONS

"Slats.", Wikipedia, The Free Encylcopedia, Jun. 27, 2006, 12:323 UTC. Wikimedia Foundation, Inc. Aug. 5, 2006; http://wn.wikipedia.org/w/index.php?title=Slats&oldid=60827639>.
U.S. Appl. No. 09/714,026, filed Nov. 16, 2000, Sakurai.
U.S. Appl. No. 10/746,883, filed Dec. 24, 2003, Boorman.
U.S. Appl. No. 10/746,912, filed Dec. 24, 2003, Boorman.
U.S. Appl. No. 10/787,644, filed Feb. 26, 2004, Tafs et al.
U.S. Appl. No. 10/798,749, filed Mar. 10, 2004, Sandell et al.
U.S. Appl. No. 10/814,369, filed Mar. 31, 2004, Chen et al.
U.S. Appl. No. 10/814,494, filed Mar. 31, 2004, Gunn et al.
U.S. Appl. No. 10/815,034, filed Mar. 31, 2004, Crane et al.
"Adaptive Aircraft: No Flight of Fancy?" Research into using exotic means of making wings change shpe in-flight looks promising, though still a long way from reality, Business Week Online, Jan. 7, 2003, pp. 1-3.
"Aero-Space Research & Technology," Space Systems, Sep. 1, 2001, pp. 1-28.
"Morphing aircraft Structure,"—Penn State University, www.personal.psu.edu/users/d/s/dsr134/mas/Cellular.htm, pp. 1-3.
"Morphing Aircraft Structures,"—Raytheon, www.defense-update.com, pp. 1-3.
Morphing Sytems, "Morphing Aerostructures-An Overview," www.crgrp.net/morphingsystems.html, pp. 1-9, [accessed Aug. 31, 2005].
European Search Report EP05075887; Oct. 24, 2005, 3 pgs.
U.S. Appl. No. 10/454,417, filed Jun. 3, 2003, Huynh.
U.S. Appl. No. 60/475,828, filed Jun. 3, 2003, Kevin W. Beyer.
777 High Lift System, 777 Maintenance Manual, Publication Date: Circa 1994 (1 page).
777 Transmission—Typical, 777 Maintenance Manual, Publication Date: Circa 1994 (1 page).
A320 Hinterkantem-Klappen-Verstell System, Trailing Edge Flap System, SAE Presentation, Publication Date: Circa 1990 (1 page).
A340 Flight Controls, SAE Presentation, Publication Date: Circa 1995 (1 page).
Boeing, 777 Aircraft Maintenance Manual, Sep. 5, 2002 (p. 39).
Drela, Mark, "Design and Optimization Method for Multi-Element Airfoils," MIT Department of Aeronautics and Astronautics, Copyright 1993 American Institute of Aeronautics and Astronautics, Inc. (pp. 1-11).
Flap Drive System, 777 Maintenance Manual, Publication Date: Circa 1994 (1 page).
Flap Transmission and Support, 777 Maintenance Manual, Publication Date: Circa 1994 (1 page).
International Search Report, PCT/US03/19724/ Sep. 11, 2003, 5 pages.
MOOG, Component Maintenance Manual, May 1994 (2 pages).
Niu, Chen-Yen, Airframe Structural Design, Chen-Yeun Niu, Conmilit Press, 1988 (1 page).
U.S. Appl. No. 10/671,435, filed Sep. 24, 2003, Kelley-Wickemyer.
U.S. Appl. No. 10/770,256, filed Nov. 3, 2003, Speer.
U.S. Appl.No. 10/789,100, filed Feb. 27, 2004, Lacy.
U.S. Appl. No. 10/868,238, filed Jun. 15, 2004, Dun.
Drela, M., "Optimization Techniques In Airfoil Design," MIT Aero & Astro, 29 pages.
Hansen, H., "Application of Mini-Trailing-Edge Devices in the Awiator Project," Airbus Deutschland, EGAG, Hunefeldstr. 1-5, D-28199 Bremen, Germany, 9 pages.
Junkers JU 52/3M (2 pages); http://www.wpafb.af.mil/museum/outdoor/od16 [Accessed Aug. 7, 2003].
Petrov, A.V., "Certain Types of Separated Flow over Slottted Wings," Fluid Mechanics—Soviet Research, vol. 7, No. 5, Sep.-Oct. 1978.
The High Speed Frontier, Chapter 2: The High-Speed Airoil Program, "Supercritical" Airfoils, 1957-1978 (4 pages); http://www.hq.nasa.gov/office/pao/History/SP-445/ch2-5.
TU 1-44 Canard, 1 pg, date unknown.
Whitcomb, Richard T., "Review of NASA Supercritical Airfoils," National Aeronautics and Space Administration, Aug. 1974 (pages 8-18).
Morphing Aircraft Structures, "Morphing Aircraft Structures—The Ceullar Approach," http://www.personal/psu.edu/users/d/s/dsr134mas/Cellular.htm, Penn State University, pp. 1-3, [accessed Aug. 31, 2005].
Morphing Aircraft Structures, "Morphing Aircraft Structures-Raytheon," http://www.defense-update.com/products/m/morphing-structures.html, pp. 1-3 [accessed Aug. 31, 2005].

AIRCRAFT LEADING EDGE APPARATUSES AND CORRESPONDING METHODS

TECHNICAL FIELD

Embodiments of the present invention relate to aircraft leading edge apparatuses, for example, variable camber leading edge flaps, and corresponding methods.

BACKGROUND

Modern aircraft often use a variety of high lift leading and trailing edge devices to improve high angle of attack performance during various phases of flight, for example, takeoff and landing. One such device is a leading edge Krueger flap, shown schematically in FIGS. 1A and 1B. FIG. 1A schematically illustrates a cross-section through a wing 10 having a Krueger flap 22 stowed proximate to the bottom surface of the wing 10. With the Krueger flap 22 in the stowed position, the wing 10 is in a low drag configuration that is suitable for cruise and other low angle of attack operations. FIG. 1B shows the Krueger flap 22 after being rotated and extended forward to create an extension of the leading edge 12 of the wing 10. When the Krueger flap 22 is in this extended position, it improves the air flow characteristics over the wing 10 at high angles of attack, allowing the wing 10 to operate at higher angles of attack without stalling.

When the Krueger flap 22 is in the extended position, it may be separated from the leading edge 12 of the wing 10 by a gap 40. A shortcoming of this arrangement is that while the gap 40 can allow the wing to operate at higher angles of attack, it can also create more drag than a configuration with little or no gap. Accordingly, a Krueger flap arrangement having a gapped extended position may be optimal for the landing phase of flight, but not for the takeoff phase during which a lower drag configuration is desired. Because Krueger flaps typically have only a retracted and an extended position, the extended position is typically optimized for landing performance.

One approach addressing this drawback is to move the Krueger flap to an intermediate position during take-off. When the Krueger flap is in the intermediate position, it is extended, but positioned against the leading edge 12 to seal the gap 40, as indicated by dashed lines in FIG. 1B. Further details of such an arrangement are provided in U.S. Pat. Nos. 5,158,252 and 6,375,126.

One feature of existing three-position Krueger flap arrangements is that they include a single drive tube or actuator coupled to a complex mechanical linkage. A drawback of this feature is that it can increase the weight of the leading edge device and/or reduce the reliability of the leading edge device. A further drawback is that even though the linkage is complex, it may not be capable of positioning the Krueger flap precisely in the most aerodynamically desirable positions. Accordingly, the arrangement may not be aerodynamically efficient, and increasing the efficiency of the arrangement may further increase the complexity and weight of the leading edge device.

SUMMARY

The present disclosure is directed generally toward aircraft leading edge apparatuses and corresponding methods. One aspect of the invention is directed toward an aircraft system that can include an airfoil and a corresponding leading edge device. The leading edge device can include a flow surface, a first link coupled between the flow surface and the airfoil, and a second link coupled to the first link. The system can further include a first actuator coupled to the first link to move the first link relative to the airfoil, and a second actuator coupled between the first and second links to move at least one link relative to the other.

In other embodiments, the airfoil can include a leading edge and a lower surface. The leading edge device can include a flow surface having a trailing edge, and can be movable among a retracted position, at least one first extended position, and a second extended position. In the retracted position, the flow surface can be positioned generally behind the leading edge of the airfoil to form a portion of the lower surface of the airfoil. In the at least one first extended position, at least a portion of the flow surface can be positioned to form an extension of the leading edge with a first distance between the trailing edge of the flow surface and the leading edge of the airfoil. In the second extended position, at least a portion of the flow surface can be positioned to form an extension of the leading edge with no distance or a second distance (smaller than the first distance) between the trailing edge of the flow surface and the leading edge of the airfoil. The system can still further include a first actuator and a second actuator. The first actuator can be operatively coupled to the leading edge device to move the leading edge device between the retracted and the at least one first extended position. The second actuator can be operatively coupled to the leading edge device to move the leading edge device between the at least one first extended position and the second extended position.

In another aspect of the invention, a method for making an aircraft system can include providing an airfoil having a leading edge, a lower surface, and multiple attachment points. The airfoil can be operatively couplable to a first leading edge device at the multiple attachment points. The first leading edge device can have a first number of extended positions. The method can further include operatively coupling a second leading edge device to the airfoil via the attachment points. The second leading edge device can have a second number of extended positions, the second number of extended positions being greater than the first number of extended positions.

DETAILED DESCRIPTION

The present disclosure describes aircraft leading edge apparatuses and corresponding methods. Several specific details of the invention are set forth in the following description and in FIGS. 2-4 to provide a thorough understanding of certain embodiments of the invention. One skilled in the art, however, will understand that the present invention may have additional embodiments and that other embodiments of the invention may be practiced without several of the specific features described below.

Figure 2A:
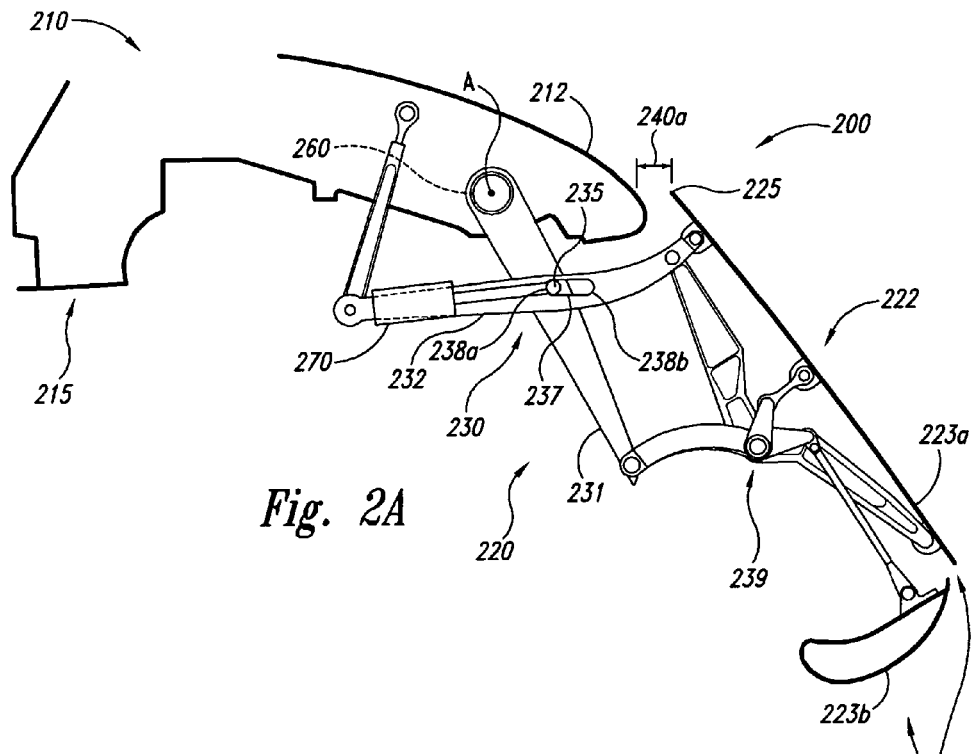
FIG. 2A is a partially schematic illustration of an aircraft system with a leading edge device in a first extended position in accordance with an embodiment of the invention.

FIG. 2A is a partially schematic illustration of an embodiment of an aircraft system 200 that includes an airfoil 210 and a leading edge device 220 (e.g., a leading edge flap or a Krueger flap). The airfoil 210 can include a leading edge 212 and a lower surface 215. The leading edge device 220 can include linkage 230 coupled to a flow surface 222, which can be curved or generally flat. The linkage 230 guides the motion of the flow surface 222 as the leading edge device 220 extends and retracts.

The flow surface 222 can have a trailing edge 225 and can include multiple sections 223, which can be movable relative to each other. In an embodiment shown in FIG. 2A, the flow surface 222 includes two sections 223, shown as a first section 223a and a second section 223b. In other embodiments, the flow surface 222 can have more or fewer sections 223. The sections 223 can be arranged to form a continuous surface (e.g., a surface without any breaks or gaps) or a noncontinuous surface (e.g., a surface with gaps or breaks), as shown in FIG. 2A. In FIG. 2A, the leading edge device 220 is shown in a first extended position with the flow surface 222 positioned to form a downward and/or forward extension of the leading edge 212. When the leading edge device 220 is in the first extended position, the trailing edge 225 of the flow surface 222 is spaced apart from the leading edge 212 of the airfoil 210 by a first distance 240a. The size of the first distance 240a can be controlled by the linkage 230.

The linkage 230 can include a drive arm 231 having a fixed pin 235, and a scissors link 232 having a slot 237 in which the pin 235 is received. The slot 237 can be elongated so as to extend from a first side 238a to a second side 238b, allowing the scissors link 232 to translate relative to the pin 235 and the drive arm 231. One end of the drive arm 231 can be coupled to a first actuator 260 to rotate relative to the airfoil 210 about axis A. An opposite end of the drive arm 231 can be coupled to the flow surface 222 via connecting links 239. The scissors link 232 can also be coupled to the flow surface 222 to control the motion of flow surface 222 relative to the airfoil 210.

In a further aspect of this embodiment, the scissors link 232 can also be configured to actively move the flow surface 222 (e.g., to change the position and/or orientation of the flow surface 222) relative to the drive arm 231. Accordingly, the scissors link 232 can include a second actuator 270 operatively coupled to the pin 235 (which is attached to the drive arm 231). As the second actuator 270 extends from the position shown in FIG. 2A, it moves the scissors link 232 to the left relative to the pin 235, changing the position of the pin 235 within the slot 237, changing the pivot point of the scissors link 232, and changing the position of the flow surface 222.

Figure 2B:
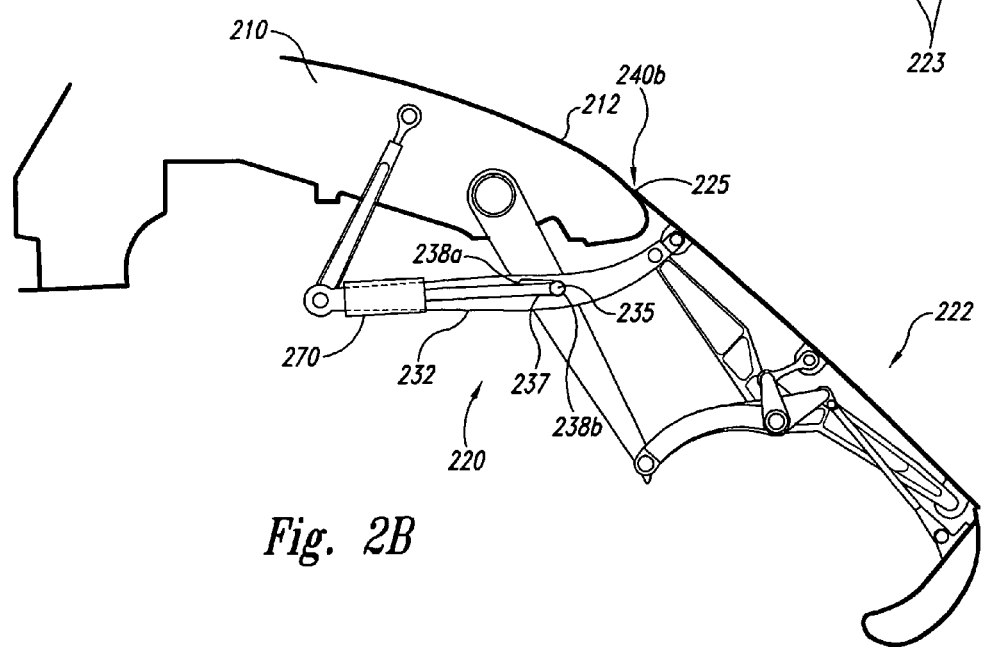
FIG. 2B is a partially schematic illustration of the aircraft system with the leading edge device shown in FIG. 2A in a second extended position in accordance with an embodiment of the invention.

FIG. 2B illustrates the airfoil after the second actuator 270 has extended and moved the leading edge device 220 from the first extended position (shown in FIG. 2A) to a second extended position (shown in FIG. 2B). The second actuator 270 has moved the scissors link 232 to the left, so that the pin 235 (which was located on the first side 238a of the slot 237) is now located on the second side 238b of the slot 237. Correspondingly, the flow surface 222 has moved so that it still forms a downward and/or forward extension of the leading edge, but now creates a second distance 240b between the trailing edge 225 of the flow surface 222 and the leading edge 212 of the airfoil 210. The second distance 240b is smaller than the first distance 240a shown in FIG. 2A and in some embodiments can have a zero value (as shown in FIG. 2B).

Figure 2C:
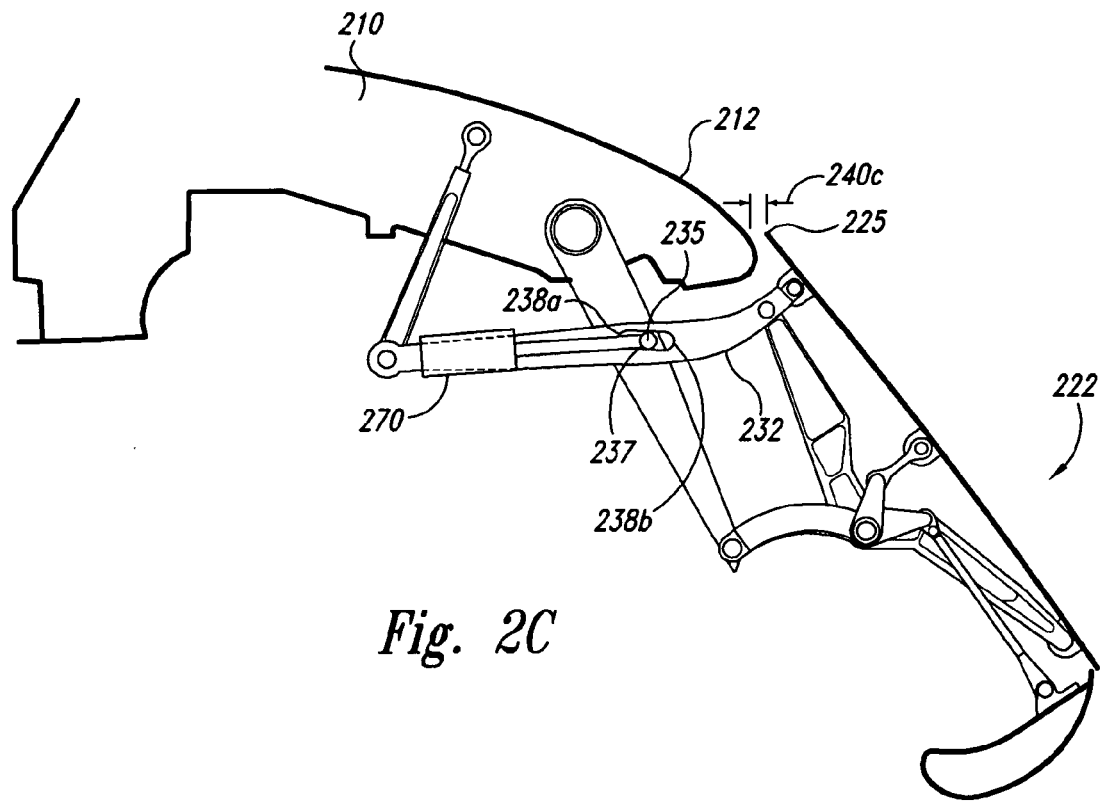
FIG. 2C is a partially schematic illustration of the aircraft system with the leading edge device shown in FIG. 2A in a third extended position in accordance with an embodiment of the invention.

The second actuator 270 can position the flow surface 222 among the first extended position, shown in FIG. 2A, the second extended position, shown in FIG. 2B, and a third extended position, shown in FIG. 2C. For example, in FIG. 2C the second actuator 270 has moved the scissors link 232 so that the pin 235 is located in the slot 237 away from and between the first and second sides 238a, 238b. Correspondingly, the flow surface 222 has moved to the third extended position between the first and second extended positions. When the leading edge device 220 is in the third extended position, the trailing edge 225 of the flow surface 222 is spaced apart from the leading edge 212 of the airfoil 210 by a third distance 240c. The third distance 240c is smaller than the first distance 240a associated with the first extended position, shown in FIG. 2A, and larger than the second distance 240b (or a zero value) associated with the second extended position, shown in FIG. 2B.

Figure 2D:
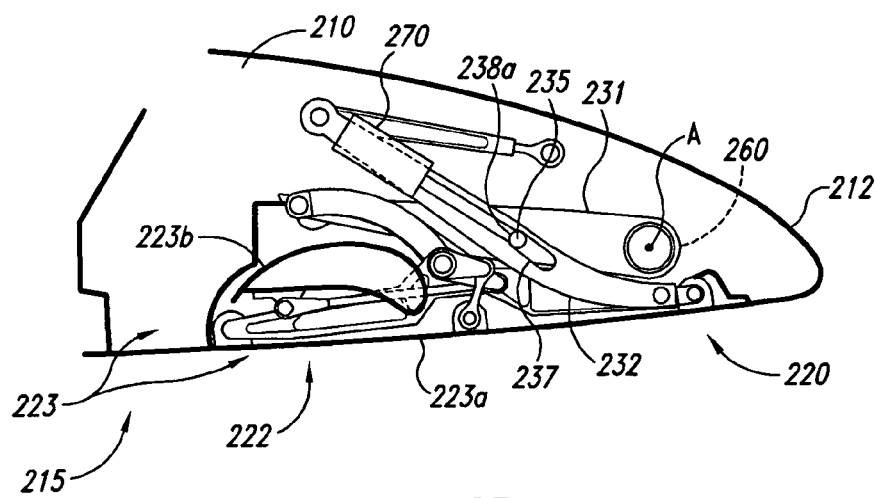
FIG. 2D is a partially schematic illustration of the aircraft system with the leading edge device shown in FIG. 2A in a retracted position in accordance with a further embodiment of the invention.

FIG. 2D illustrates the leading edge device 220 after the first actuator 260 has moved it from the first extended position (shown in FIG. 2A) to the retracted position. As the first actuator 260 moves the leading edge device 220 between these positions, the pin 235 can be held against the first side 238a of the slot 237 by the second actuator 270. For example, as the first actuator 260 moves the leading edge device 220 from the first extended position (shown in FIG. 2A) to the retracted position (shown in FIG. 2D), the drive arm 231 rotates in a clockwise direction about axis A and moves the flow surface 222. As the drive arm 231 rotates, the scissors link 232, which is pivotally coupled to the drive arm 231, also moves, moving the flow surface 222 relative to the drive arm 231. These actions can cause the flow surface 222 to move aft relative to the leading edge 212 of the airfoil 210 and to rotate until it reaches the retracted position.

When in the retracted position, the flow surface 222 is positioned generally behind the leading edge 212 of the airfoil 210 to form a portion of the lower surface 215 of the airfoil 210. In an embodiment shown in FIG. 2D, the first section 223a of the flow surface 222 forms a portion of the lower surface 215 of the airfoil 210, while the second section 223b is recessed into the airfoil 210. In other embodiments, the leading edge device 220 can have other arrangements with different portions of the flow surface 222 or sections 223 of the flow surface 222 forming portions of the lower surface 215 of the airfoil 210.

The leading edge device 220 can be moved from the retracted position (FIG. 2D) to the first extended position (FIG. 2A) by reversing the retraction process discussed above with reference to FIGS. 2A and 2D. For example, the first actuator 260 can move the leading edge device 220 from the retracted position to the first extended position by rotating the drive arm 231 in a counter-clockwise direction about axis A. As the drive arm 231 rotates, the scissors link 232 also moves, moving the flow surface 222 relative to the drive arm 231. Correspondingly, the flow surface 222 can rotate and move generally forward relative to the leading edge 212 to the first extended position. In other embodiments, the leading edge device 220 can have multiple first extended positions, for example, when the first actuator 260 moves the drive arm 231 to an extended position different than shown in FIG. 2A, but the second actuator holds the pin 235 against the first side 238a of the slot 237.

In certain embodiments, the first and second actuators 260, 270 can operate in a sequential manner. For example, when the flow surface 222 moves from the retracted position, shown in FIG. 2D, to the second extended position, shown in FIG. 2B, the first actuator 260 can move the leading edge device 220 from the retracted position to the first extended position shown in FIG. 2A. The second actuator 270 can then move the leading edge device 220 from the first extended position to the second extended position. In other embodiments, the first and second actuators 260, 270 can operate simultaneously to move the flow surface 222 from the retracted position to the second extended position, to move the flow surface 222 from the second extended position to the retracted position, or both. For example, when the flow surface 222 moves from the retracted position (FIG. 2D) to the second extended position (FIG. 2B) the two actuators can move together to position the flow surface 222 directly from the retracted position to the second extended position.

In other embodiments, the aircraft system can include other arrangements of linkages and actuators, including other arrangements of links, pins, and slots. For example, in certain embodiments, the second actuator 270 can be coupled between the airfoil 210 and the leading edge device 220. The actuators 260, 270 can include any of several types, e.g., pneumatic, hydraulic, and/or electric. Each actuator can have a single drive element (e.g., a single piston and cylinder) as shown in FIGS. 2A–2D, or multiple elements.

One feature of embodiments of aircraft systems described above is that they can be arranged to deploy the leading edge device to multiple extended positions with a relatively simple linkage arrangement. One advantage of this feature is that the aircraft systems can be made lighter than systems requiring complex linkages, saving weight, and thereby increasing aircraft performance and reducing operating costs. Another advantage is that less complex linkages can be more reliable than complex linkages, thereby increasing the reliability of the aircraft system.

Another feature of embodiments of aircraft systems described above is that the second actuator can allow the flow surface of the leading device to be precisely positioned to an aerodynamically desirable position without complex linkages. By precisely positioning the leading edge device at an aerodynamically desirable location, aircraft performance can be increased. An advantage of this feature is that it can increase aerodynamic performance characteristics without significantly increasing aircraft weight or reducing the reliability of the aircraft system.

Figure 1A:
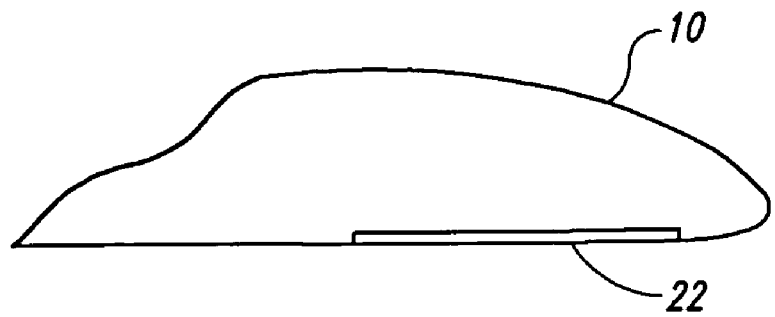
FIG. 1A is a partially schematic illustration of a Krueger flap in a retracted position in accordance with the prior art.
Figure 1B:
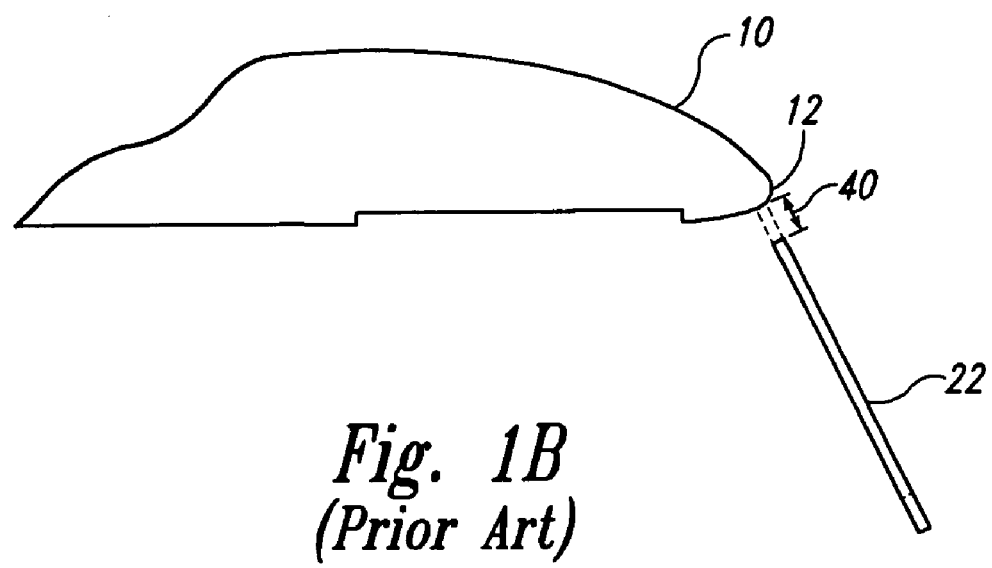
FIG. 1B is a partially schematic illustration of a Krueger flap in an extended position in accordance with the prior art.
Figure 3A:
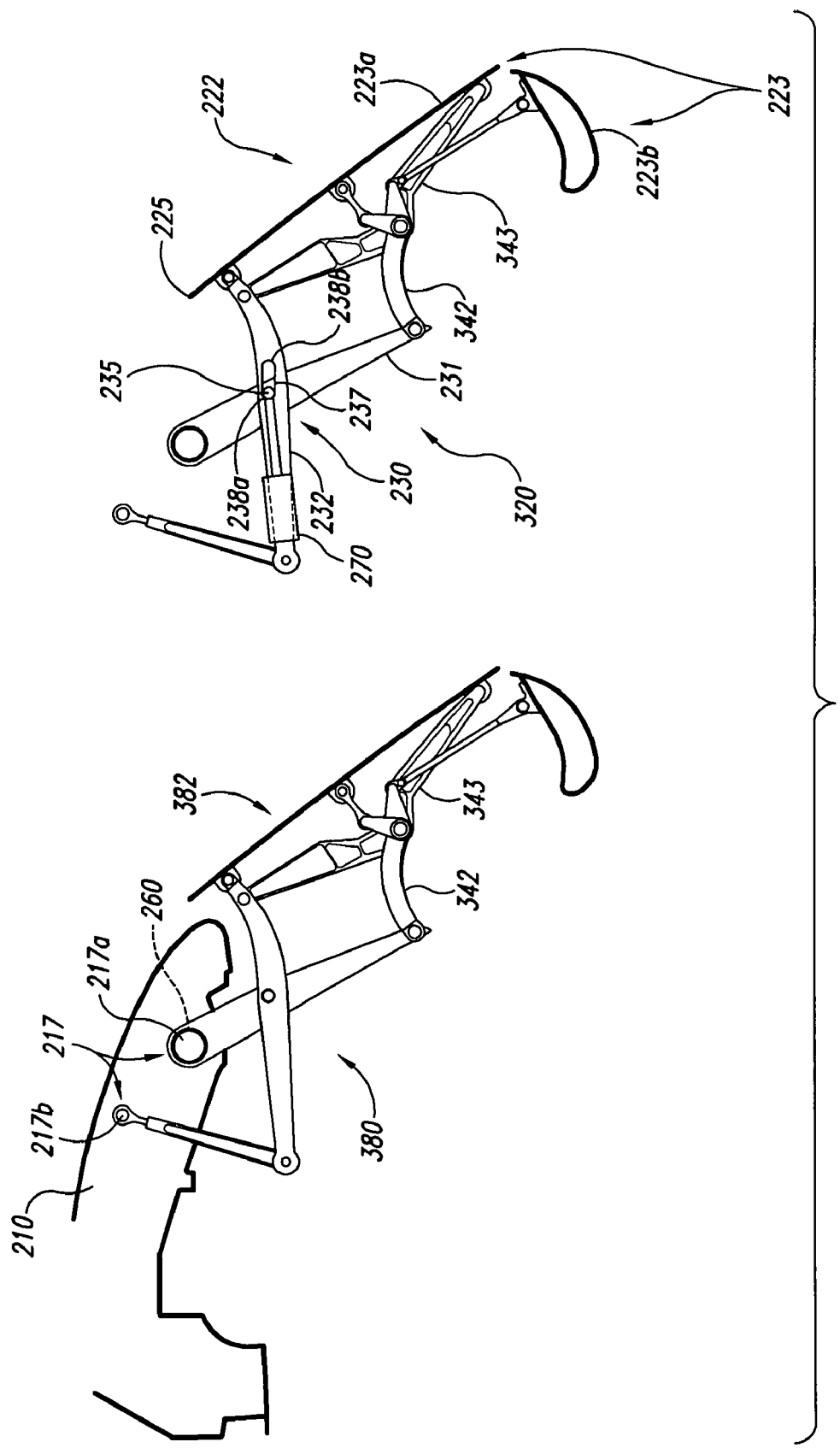
FIG. 3A is a partially schematic illustration of a first leading edge device that can be removed and replaced in accordance with another embodiment of the invention.
Figure 3B:
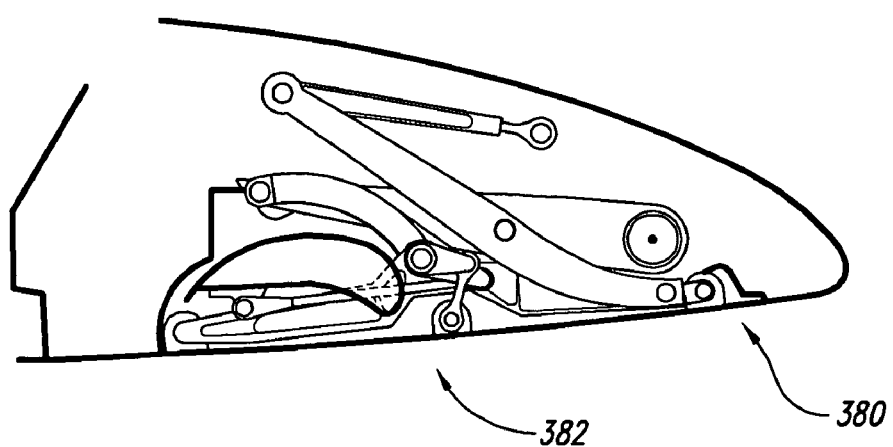
FIG. 3B is a partially schematic illustration of the first leading edge device, shown in FIG. 3A in the retracted position in accordance with another embodiment of the invention.

Embodiments of the aircraft system described above can be installed on airfoils configured to be operatively coupled to other, different types of leading edge devices, e.g., in a retrofit operation. For example, FIG. 3A is partially schematic illustration of a first leading edge device 380 coupled to an airfoil 210, generally similar to that shown in FIG. 2A. The first leading edge device 380 can be similar to the Krueger flap discussed with reference to FIG. 1A and can have a first position (e.g., an extended position), shown in FIG. 3A, and a second position (e.g., a retracted position), discussed in further detail below with reference to FIG. 3B. The first leading edge device 380 can be attached to the airfoil 210 at one or more attachment points 217 (two attachment points 217 are shown in FIG. 3A as first attachment point 217a and second attachment point 217b). The first leading edge device 380 can be operatively coupled to the first actuator 260 at the first attachment point 217a. In certain embodiments, the first leading edge device 380 can be coupled directly to the first actuator 260, while in other embodiments the first leading edge device 380 can be coupled to the first actuator 260 by other linkages (e.g., a torque tube).

The first leading edge device 380 can be removed and replaced by a second leading edge device 320 having characteristics generally similar to those of the leading edge device 220 described above with reference to FIGS. 2A–2D. The second leading edge device 320 can have more extended positions than the first leading edge device 380 (e.g., the second leading edge device 320 can have at least a retracted position, first extended position, and second extended position). The first leading edge device 380 can be disconnected from the attachment points 217, decoupled from the first actuator 260, and removed from the airfoil 210. The second leading edge device 320 can then be installed using the same attachment points 217. Additionally, the second leading edge device 320 can be operatively coupled to the same or a different first actuator 260 (e.g., a different first actuator 260 can be installed with the second leading edge device 320). In certain embodiments, the second leading edge device 320 can share common elements or components (e.g., links and pins) with the first leading edge device 380. For example, the first and second leading edge devices 380, 320 can have the same crescent link 342 and support link 343.

In certain embodiments, the first and second leading edge devices 380, 320 can have similar flow surfaces placed in similar positions relative to the airfoil 210. For example, the second flow surface 222 of the second leading edge device 320 can be at least approximately identical to a first flow surface 382 of the first leading edge device 380 (e.g., the first and second flow surfaces 222, 382 can be the same or only nominally different). Additionally, the second leading edge device 320 can have a first extended position that places the second flow surface 222 in a position relative to the airfoil 210 that is at least approximately identical to that of the first flow surface 382 when the first leading edge device 380 is in the first position (shown in FIG. 3A). Similarly, the second leading edge device 320 can have a retracted position that places the second flow surface 222 in a position relative to the airfoil 210 that is at least approximately identical to the position of the first flow surface 382 when the first leading edge device 380 is in the second position (shown in FIG. 3B).

In other embodiments, although the airfoil 210 is configured to be operatively coupled to the first leading edge device 380, the first leading edge device 380 need not be installed on the airfoil 210. Instead, the second leading edge device 320 can be installed without first installing the first leading edge device 380. For example, an aircraft that was originally designed with the first leading edge device 380, if still in production, can have the second leading edge device 320 installed during production rather than in a retrofit operation.

One feature of embodiments of aircraft systems described above is that they can be installed on an airfoil configured to be coupled to a different leading edge device with little structural modification, while providing new flow surfaces, additional positions, and/or positions that yield improved performance characteristics. For example, the new leading edge device can share common components with the original leading edge device installed on the airfoil, or for which the airfoil was originally designed. The new leading edge device can also share common attachment points with the original leading edge device. An advantage of these features is that they can reduce the cost of installing the new leading edge device, whether during production or during a retrofit operation. Another advantage of these features is that an operator can use many of the same spare parts that were designed for the original leading edge device on the new leading edge device, thereby reducing maintenance and inventory costs. Yet another advantage is that the amount of testing required for verification and certification of the new leading edge device can be reduced in some cases where the new and original leading edge devices share common flow surfaces and positions, thereby reducing verification and certification costs.

Figure 4:
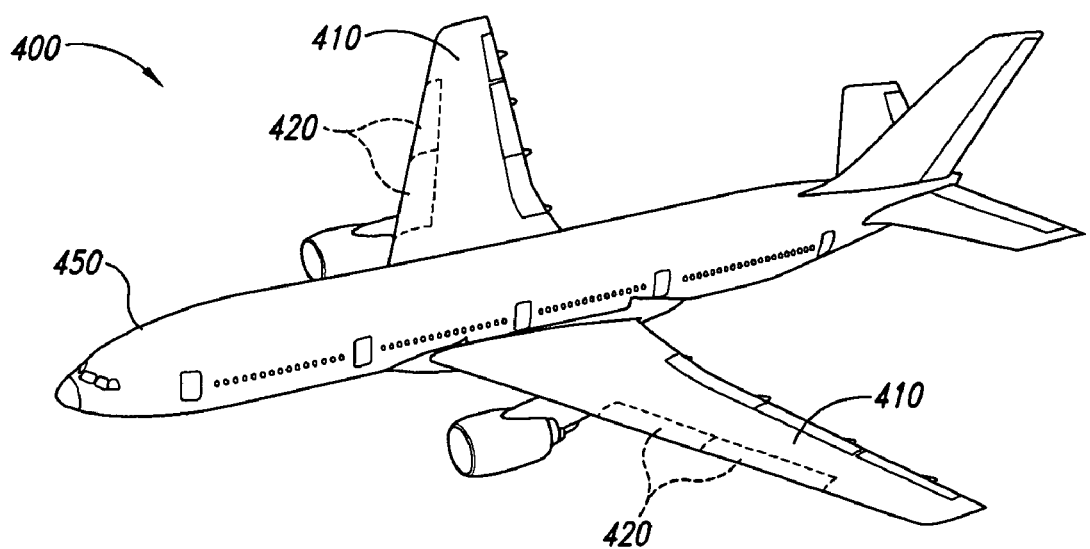
FIG. 4 is a partially schematic illustration of an aircraft that includes a leading edge device in accordance with embodiments of the invention.

FIG. 4 is a partially schematic illustration of an aircraft system 400 that includes an aircraft 450 with an airfoil 410 (e.g., a wing) having a leading edge device 420 in accordance with embodiments of the invention described above. In FIG. 4, two leading edge devices 420 are shown on each wing. In other embodiments, the leading edge device(s) 420 can be installed on other portions (e.g., airfoils) of the aircraft 450.

From the foregoing, it will be appreciated that specific embodiments of the invention have been described herein for purposes of illustration, but that various modifications may be made without deviating from the spirit and scope of the invention. For example, features described above in the context of particular embodiments can be combined or eliminated in other embodiments. Accordingly, the invention is not limited except as by the appended claims.

We claim:

1. An aircraft system, comprising:
an airfoil;
a leading edge device having a flow surface, a first link coupled between the airfoil and the flow surface to move the flow surface relative to the air foil, and a second link coupled to the first link, the first link having a pin, the second link having an elongated slot in which the pin is received to pivotally couple the first link to the second link and to permit the second link to translate relative to the first link, the second link being coupled to the flow surface to move the flow surface relative to the first link and relative to the airfoil;
a first actuator coupled to the first link to move the first link relative to the airfoil; and
a second actuator coupled between the first and second links to move at least one link relative to the other.

2. The system of claim 1, further comprising an aircraft, and wherein the airfoil is coupled to the aircraft.

3. The system of claim 1 wherein the flow surface includes multiple sections movable relative to each other.

4. An aircraft system, comprising:
an airfoil having a leading edge and a lower surface;
a leading edge device coupled to the airfoil, the leading edge device including a flow surface having a trailing edge, the leading edge device being movable among:
a retracted position wherein the flow surface is positioned generally behind the leading edge of the airfoil to form a portion of the lower surface of the airfoil;
at least one first extended position wherein at least a portion of the flow surface is positioned forward of the leading edge of the airfoil to form an extension of the leading edge with a first distance between the trailing edge of the flow surface and the leading edge of the airfoil; and
a second extended position wherein at least a portion of the flow surface is positioned forward of the leading edge of the airfoil to form an extension of the leading edge with no distance or a second distance between the trailing edge of the flow surface and the leading edge of the airfoil, the second distance being smaller than the first distance;
a first actuator operatively coupled to the leading edge device to move the leading edge device between the retracted position and the at least one first extended position; and
a second actuator operatively coupled to the leading edge device to move the leading edge device between the at least one first extended position and the second extended position.

5. The system of claim 4, further comprising an aircraft, and wherein the airfoil is coupled to the aircraft.

6. The system of claim 4 wherein the leading edge device includes a Krueger flap.

7. The system of claim 4 wherein the first actuator includes a pneumatic actuator.

8. The system of claim 4 wherein the second actuator includes an electric actuator.

9. The system of claim 4 wherein the first and second actuators are configured to operate in a sequential manner.

10. The system of claim 4 wherein the first and second actuators are configured to operate simultaneously to move the leading edge device from the retracted position to the second extended position, to move the leading edge device from the second extended position to the retracted position, or both.

11. The system of claim 4 wherein the flow surface includes multiple sections movable relative to each other.

12. The system of claim 4 wherein:
the leading edge device is movable to a third extended position between the first and the second extended positions; and wherein
the second actuator is configured to move the leading edge device among the at least one first extended position, the second extended position, and the third extended position.

13. An aircraft system, comprising:
an airfoil having a leading edge, a lower surface, and multiple attachment points, the airfoil being configured to be operatively coupled to a first leading edge device at the multiple attachment points, the first leading edge device having a first flow surface and a first number of extended positions;
a second leading edge device coupled to the airfoil at the multiple attachment points, the second leading edge device having a second flow surface with a trailing edge and a second number of extended positions, the second number of extended positions being greater than the first number of extended positions, wherein the second leading edge device is movable among:

a retracted position wherein the second flow surface is positioned generally behind the leading edge of the airfoil to form a portion of the lower surface of the airfoil;

at least one first extended position wherein at least a portion of the second flow surface is positioned forward of the leading edge of the airfoil to form an extension of the leading edge with a first distance between the trailing edge of the second flow surface and the leading edge of the airfoil; and a second extended position wherein at least a portion of the second flow surface is positioned forward of the leading edge of the airfoil to form an extension of the leading edge with no distance or a second distance between the trailing edge of the second flow surface and the leading edge of the airfoil, the second distance smaller than the first distance; and wherein the system further comprises:

a first actuator operatively coupled to the second leading edge device to move the second leading edge device surface between the retracted position and the at least one first extended position; and a second actuator operatively coupled to the second leading edge device to move the second leading edge device between the at least one first extended position and the second extended position.

14. The system of claim 13, further comprising an aircraft, and wherein the airfoil is coupled to the aircraft.

15. The system of claim 13 wherein the second leading edge device includes at least one of a link, a pin, and at least a portion of a flow surface that is at least approximately identical to a corresponding link, pin, and flow surface portion of the first leading edge device.

16. The system of claim 13 wherein the first actuator is configured to be operatively couplable to the first leading edge device to move the first flow surface.

17. The system of claim 13 wherein:
the first flow surface of the first leading edge device is at least approximately identical to the second flow surface of the second leading edge device; and wherein
the first leading edge device, when operatively coupled to the airfoil, is movable between:
a first position that places the first flow surface in a position relative to the airfoil that is at least approximately identical to the position of the second flow surface when the second leading edge device is in the first extended position; and
a second position that places the first flow surface in a position relative to the airfoil that is at least approximately identical to the position of the second flow surface when the second leading edge device is in the retracted position.

18. An aircraft system, comprising:
an airfoil having a leading edge and a lower surface;
a leading edge device coupled to the airfoil, the leading edge device including:
a flow surface having a trailing edge;
a drive arm, the drive arm being coupled to the flow surface and configured to rotate the flow surface generally forward and downward from the retracted position, the drive arm having a pin;
a scissors link, the scissors link having a slot in which the pin is received to pivotally couple the drive arm and the scissors link and to permit the scissors link to translate relative to the drive arm, the scissors link being coupled to the flow surface to move the flow surface relative to the drive arm; and wherein the leading edge device is movable among:
a retracted position wherein the flow surface is positioned generally behind the leading edge of the airfoil to form a portion of the lower surface of the airfoil;
at least one first extended position wherein at least a portion of the flow surface is positioned to form an extension of the leading edge with a first distance between the trailing edge of the flow surface and the leading edge of the airfoil; and
a second extended position wherein at least a portion of the flow surface is positioned to form an extension of the leading edge with no distance or a second distance between the trailing edge of the flow surface and the leading edge of the airfoil, the second distance being smaller than the first distance;
a first actuator operatively coupled to the drive arm to move the leading edge device between the retracted position and the at least one first extended position; and
a second actuator operatively coupled to the scissors link and the drive arm to translate the scissors link and move the leading edge device between the at least one first extended position and the second extended position.

19. The system of claim 18 wherein the scissors link is coupled to the flow surface to change at least one of a position and an orientation of the flow surface relative to the drive arm.

20. The system of claim 18, further comprising an aircraft, and wherein the airfoil is coupled to the aircraft.

21. The system of claim 18 wherein the first actuator is coupled to the airfoil and the leading edge device.

22. The system of claim 18 wherein the first and second actuators are configured to operate in a sequential manner.

23. The system of claim 18 wherein the first and second actuators are configured to operate simultaneously to move the leading edge device from the retracted position to the second extended position, to move the second flow surface from the second extended position to the retracted position, or both.

24. An aircraft system, comprising:
an airfoil having a leading edge and a lower surface;
leading edge extension means for extending the leading edge, the leading edge extension means having a flow surface with a trailing edge, the leading edge extension means being movable among:
a retracted position wherein the flow surface is positioned generally behind the leading edge of the airfoil to form a portion of the lower surface of the airfoil;
at least one first extended position wherein at least a portion of the flow surface is positioned forward of the leading edge of the airfoil to form an extension of the leading edge with a first distance between the trailing edge of the flow surface and the leading edge of the airfoil; and
a second extended position wherein at least a portion of the flow surface is positioned forward of the leading edge of the airfoil to form an extension of the leading edge with no distance or a second distance between the trailing edge of the flow surface and the leading edge of the airfoil, the second distance being smaller than the first distance;
first actuator means for moving the leading edge extension means between the retracted position and the at least one first extended position; and second actuator means for moving the leading edge extension means between the at least one first extended position and the second extended position.

25. The system of claim 24, further comprising an aircraft, and wherein the airfoil is coupled to the aircraft.

26. The system of claim 24 wherein the first actuator means is coupled to the airfoil and the leading edge device means.

27. The system of claim 24 wherein:
the leading edge extension means is movable to a third extended position between the first and second extended positions; and wherein
the second actuator means is configured to move the leading edge extension means among the at least one first extended position, the second extended position, and the third extended position.

28. A method for making an aircraft system, comprising:
providing an airfoil;
installing a leading edge device having a flow surface on the airfoil, the leading edge device having a first link coupled between the airfoil and the flow surface to move the flow surface relative to the air foil and a second link coupled to the first link, the first link having a pin, the second link having an elongated slot in which the pin is received to pivotally couple the first link to the second link and to permit the second link to translate relative to the first link, the second link being coupled to the flow surface to move the flow surface relative to the first link and relative to the airfoil;
operatively coupling a first actuator to the first link to move the first link relative to the airfoil; and
operatively coupling a second actuator between the first and second links to move at least one link relative to the other.

29. The method of claim 28, further comprising installing the airfoil on an aircraft.

30. The method of claim 28 wherein installing a leading edge device includes installing a leading edge device having a flow surface with multiple sections movable relative to each other.

31. A method for making an aircraft system, comprising:
providing an airfoil having a leading edge and a lower surface;
installing the leading edge device on the airfoil, the leading edge device including a flow surface and a trailing edge, the leading edge device being movable among:
a retracted position wherein the flow surface is positioned generally behind the leading edge of the airfoil to form a portion of the lower surface of the airfoil;
at least one first extended position wherein at least a portion of the flow surface is positioned forward of the leading edge of the airfoil to form an extension of the leading edge with a first distance between the trailing edge of the flow surface and the leading edge of the airfoil; and
a second extended position wherein at least a portion of the flow surface is positioned forward of the leading edge of the airfoil to form an extension of the leading edge with no distance or a second distance between the trailing edge of the flow surface and the leading edge of the airfoil, the second distance being smaller than the first distance;

operatively coupling a first actuator to the leading edge device to move the leading edge device between the retracted position and the at least one first extended position; and
operatively coupling a second actuator to the leading edge device to move the leading edge device between the at least one first extended position and the second extended position.

32. The method of claim 31, further comprising installing the airfoil on an aircraft.

33. The method of claim 31, further comprising moving the flow surface to at least one of the retracted position, the at least one first extended position, and the second extended position.

34. The method of claim 31 wherein installing a leading edge device includes installing a leading edge device that includes a Krueger flap.

35. The method of claim 31, further comprising coupling the first actuator to the airfoil.

36. The method of claim 31 wherein installing a leading edge device includes installing a leading edge device having a flow surface with multiple sections that are movable relative to each other.

37. The method of claim 31 wherein:
installing a leading edge device includes installing a leading edge device that is movable to a third extended position between the first extended position and the second extended position; and wherein
operatively coupling a second actuator to the leading edge device includes operatively coupling a second actuator to the leading edge device to move the flow surface among the at least one first extended position, the second extended position, and the third extended position.

38. The method of claim 31 wherein installing the leading edge device on the airfoil includes installing a leading edge device by:
connecting a drive arm to the flow surface to rotate the flow surface generally forward and down from the retracted position;
coupling a pin of the drive arm with a slot of the scissors link to pivotally couple the drive arm and the scissors link and to permit the scissors link to translate relative to the drive arm; and
connecting the scissors link to the flow surface to move the flow surface relative to the drive arm; and wherein
operatively coupling a second actuator to the leading edge device includes operatively coupling a second actuator to the scissors link and the drive arm to translate the scissors link and move the leading edge device between the at least one first extended position and the second extended position.

39. A method for making an aircraft system, comprising:
providing an airfoil having a leading edge, a lower surface, and multiple attachment points, the airfoil being operatively couplable to a first leading edge device at the multiple attachment points, the first leading edge device having a first number of extended positions; and
operatively coupling a second leading edge device to the airfoil via the attachment points, the second leading edge device having a second number of extended positions, the second number of extended positions being greater than the first number of extended positions, wherein the second leading edge device is movable among:

a retracted position wherein a flow surface of the second leading edge device is positioned generally behind the leading edge of the airfoil to form a portion of the lower surface of the airfoil;

at least one first extended position wherein at least a portion of the flow surface is positioned forward of the leading edge of the airfoil to form an extension of the leading edge with a first distance between a trailing edge of the flow surface and the leading edge of the airfoil; and a second extended position wherein at least a portion of the flow surface is positioned forward of the leading edge of the airfoil to form an extension of the leading edge with no distance or a second distance between the trailing edge of the flow surface and the leading edge of the airfoil, the second distance being smaller than the first distance; and wherein the method further comprises:

operatively coupling a first actuator to the second leading edge device to move the second leading edge device surface between the retracted position and the at least one first extended position; and operatively coupling a second actuator to the second leading edge device to move the second leading edge device between the at least one first extended position and the second extended position.

40. The method of claim 39 wherein providing an airfoil includes providing an airfoil operatively coupled to the first leading edge device and wherein the method further comprises removing the first leading edge device from the airfoil before operatively coupling the second leading edge device.

41. The method of claim 39 wherein providing an airfoil includes providing an airfoil coupled to the first actuator, the first actuator being coupled to the first leading edge device, and wherein the method further comprises decoupling the first leading edge device from the first actuator and removing the first leading edge device from the airfoil.

42. The method of claim 39 wherein providing an airfoil includes providing an airfoil attached to an aircraft.

43. The method of claim 39 wherein installing a second leading edge device includes installing a second leading edge device that includes at least one of a link, a pin, and at least a portion of a flow surface that is at least approximately identical to a corresponding link, pin, and portion of a flow surface of the first leading edge device.

44. The method of claim 39 wherein the flow surface of the second leading edge device includes a second flow surface, and wherein providing an airfoil includes providing an airfoil operatively coupled to the first leading edge device, the first leading edge device including a first flow surface, and further wherein operatively coupling a second leading edge device to the airfoil includes operatively coupling a second leading edge device to the airfoil wherein the second flow surface is at least approximately identical to the first flow surface of the first leading edge device.

45. A method for configuring an aircraft for various phases of flight, comprising:

activating a first actuator to move a leading edge device from a retracted position wherein a flow surface of the device forms a portion of a lower surface of an airfoil to at least one first extended position wherein at least a portion of the flow surface is positioned forward of the leading edge of the airfoil to form an extension of a leading edge of the airfoil with a first distance between a trailing edge of the flow surface and the leading edge of the airfoil; and activating a second actuator to move the leading edge device to a second extended position wherein at least a portion of the flow surface is positioned forward of the leading edge of the airfoil to form an extension of the leading edge with no distance or a second distance between the trailing edge of the flow surface and the leading edge of the airfoil, the second distance being smaller than the first distance.

46. The method of claim 45, further comprising operating the aircraft in a takeoff phase of flight with the leading edge device in the second extended position.

47. The method of claim 45, further comprising:

positioning the leading edge device in the retracted position; and operating the aircraft in cruise with the leading edge device in the retracted position.

48. The method of claim 45, further comprising operating the aircraft in a landing phase of flight with the leading edge device in the first extended position.

* * * * *

UNITED STATES PATENT AND TRADEMARK OFFICE
CERTIFICATE OF CORRECTION

PATENT NO.       : 7,270,305 B2
APPLICATION NO.  : 10/868234
DATED            : September 18, 2007
INVENTOR(S)      : Rampton et al.

It is certified that error appears in the above-identified patent and that said Letters Patent is hereby corrected as shown below:

Title Page 4, in field (56), under "Other Publications", in column 1, line 13, delete "shpe" and insert -- shape --, therefor.

Title Page 4, in field (56), under "Other Publications", in column 1, line 22, delete "Systems." and insert -- Systems, --, therefor.

Title Page 4, in field (56), under "Other Publications", in column 2, line 24, delete "Awiator" and insert -- Aviator --, therefor.

Title Page 4, in field (56), under "Other Publications", in column 2, line 28, delete "Slottted" and insert -- Slotted --, therefor.

Title Page 4, in field (56), under "Other Publications", in column 2, line 31, delete "Airoil" and insert -- Airfoil --, therefor.

Title Page 4, in field (56), under "Other Publications", in column 2, line 39, delete "Ceullar" and insert -- Cellular --, therefor.

In column 7, line 46, in Claim 1, delete "air foil," and insert -- airfoil, --, therefor.

In column 11, line 23, in Claim 28, delete "air foil" and insert -- airfoil --, therefor.

Signed and Sealed this

Twenty-ninth Day of July, 2008

JON W. DUDAS
*Director of the United States Patent and Trademark Office*